United States Patent
Peters et al.

(10) Patent No.: US 11,164,606 B2
(45) Date of Patent: Nov. 2, 2021

(54) AUDIO-DRIVEN VIEWPORT SELECTION

(71) Applicant: QUALCOMM Incorporated, San Diego, CA (US)

(72) Inventors: Nils Günther Peters, San Diego, CA (US); Shankar Thagadur Shivappa, San Diego, CA (US); Dipanjan Sen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/672,080

(22) Filed: Aug. 8, 2017

(65) Prior Publication Data

US 2019/0005986 A1   Jan. 3, 2019

Related U.S. Application Data

(60) Provisional application No. 62/527,794, filed on Jun. 30, 2017.

(51) Int. Cl.
*G11B 27/22* (2006.01)
*H04N 21/81* (2011.01)
(Continued)

(52) U.S. Cl.
CPC .......... *G11B 27/22* (2013.01); *H04N 5/2258* (2013.01); *H04N 5/23238* (2013.01);
(Continued)

(58) Field of Classification Search
CPC .. G11B 27/22; H04N 5/2258; H04N 5/23238; H04N 5/602; H04N 9/802;
(Continued)

(56) References Cited

U.S. PATENT DOCUMENTS 6,025,839 A   2/2000   Schell et al.
9,195,306 B2  11/2015  Gomez
(Continued)

FOREIGN PATENT DOCUMENTS

GB   2543320 A      4/2017
WO   2016191702 A1  12/2016
WO   2017030985 A1  2/2017

OTHER PUBLICATIONS

Sheikh et al., "Directing Attention in 360-Degree Video," IBC 2016 Conference, Sep. 8-12, 2016, 9 pp.
(Continued)

*Primary Examiner* — Sunghyoun Park
(74) *Attorney, Agent, or Firm* — Espartaco Diaz Hidalgo

(57) ABSTRACT

An example device includes a memory device, and a processor coupled to the memory device. The memory is configured to store audio spatial metadata associated with a soundfield and video data. The processor is configured to identify one or more foreground audio objects of the soundfield using the audio spatial metadata stored to the memory device, and to select, based on the identified one or more foreground audio objects, one or more viewports associated with the video data. Display hardware coupled to the processor and the memory device is configured to output a portion of the video data being associated with the one or more viewports selected by the processor.

28 Claims, 14 Drawing Sheets

(51) Int. Cl.

| | |
|---|---|
| *H04N 21/439* | (2011.01) |
| *H04N 21/2343* | (2011.01) |
| *H04N 21/2368* | (2011.01) |
| *H04N 21/6587* | (2011.01) |
| *H04N 5/225* | (2006.01) |
| *H04N 9/82* | (2006.01) |
| *H04N 5/60* | (2006.01) |
| *H04N 5/232* | (2006.01) |
| *H04N 9/802* | (2006.01) |
| *H04S 7/00* | (2006.01) |
| *G06T 19/00* | (2011.01) |
| *H04N 7/01* | (2006.01) |
| *H04R 1/02* | (2006.01) |
| *H04R 1/40* | (2006.01) |

(52) U.S. Cl.
CPC .............. *H04N 5/602* (2013.01); *H04N 9/802* (2013.01); *H04N 9/8205* (2013.01); *H04N 21/2368* (2013.01); *H04N 21/23439* (2013.01); *H04N 21/4394* (2013.01); *H04N 21/6587* (2013.01); *H04N 21/8106* (2013.01); *H04N 21/816* (2013.01); *H04S 7/303* (2013.01); *G06T 19/006* (2013.01); *H04N 7/0117* (2013.01); *H04R 1/028* (2013.01); *H04R 1/406* (2013.01); *H04S 2400/11* (2013.01); *H04S 2400/15* (2013.01); *H04S 2420/11* (2013.01)

(58) Field of Classification Search
CPC ........... H04N 9/8205; H04N 21/23439; H04N 21/2368; H04N 21/4394; H04N 21/6587; H04N 21/8106; H04N 21/816; H04S 7/303
See application file for complete search history.

(56) References Cited

U.S. PATENT DOCUMENTS

| | | | | |
|---|---|---|---|---|
| 2003/0160862 A1* | 8/2003 | Charlier | ............. | H04N 5/23238 348/14.08 |
| 2005/0156817 A1* | 7/2005 | Iba | ....................... | G02B 27/017 345/8 |
| 2007/0230829 A1 | 10/2007 | Sirohey et al. | | |
| 2007/0263823 A1* | 11/2007 | Jalava | .................... | H04M 3/568 379/202.01 |
| 2009/0033737 A1 | 2/2009 | Goose et al. | | |
| 2009/0127899 A1* | 5/2009 | Maguire, Jr. | ........... | G06F 3/011 297/217.3 |
| 2009/0244257 A1* | 10/2009 | MacDonald | ........... | H04N 7/181 348/14.09 |
| 2011/0249821 A1 | 10/2011 | Jaillet et al. | | |
| 2012/0162362 A1* | 6/2012 | Garden | .............. | H04N 13/0468 348/42 |
| 2012/0163625 A1* | 6/2012 | Siotis | ..................... | H04R 3/005 381/92 |
| 2012/0320013 A1* | 12/2012 | Perez | ................... | H04N 21/632 345/207 |
| 2013/0162752 A1* | 6/2013 | Herz | ........................ | H04N 7/15 348/14.08 |
| 2014/0361977 A1 | 12/2014 | Stafford et al. | | |
| 2015/0070357 A1* | 3/2015 | Tahan | ....................... | G06F 3/14 345/428 |
| 2015/0130799 A1* | 5/2015 | Holzer | ................. | G06F 16/532 345/420 |
| 2015/0271621 A1 | 9/2015 | Sen et al. | | |
| 2016/0012855 A1 | 1/2016 | Krishnan | | |
| 2016/0050366 A1* | 2/2016 | Hansson | ............ | H04N 5/23238 386/224 |
| 2016/0080684 A1* | 3/2016 | Farrell | ................. | H04N 9/8211 386/227 |
| 2016/0104495 A1 | 4/2016 | Peters et al. | | |
| 2016/0379415 A1 | 12/2016 | Espeset et al. | | |
| 2017/0045941 A1 | 2/2017 | Tokubo et al. | | |
| 2017/0076485 A1* | 3/2017 | Shuster | ................... | G06T 15/20 |
| 2017/0295446 A1* | 10/2017 | Thagadur Shivappa | .................... | H04S 7/304 |
| 2017/0337743 A1* | 11/2017 | Metzler | .................. | G01C 15/02 |
| 2018/0144752 A1* | 5/2018 | McDowell | ............ | G10L 19/008 |
| 2018/0217380 A1* | 8/2018 | Nishimaki | ......... | G02B 27/0176 |
| 2018/0367777 A1* | 12/2018 | Li | ............................. | G01S 3/00 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Poletti, "Three-Dimensional Surround Sound Systems Based on Spherical Harmonics," J. Audio Eng. Soc., vol. 53, No. 11, Nov. 2005, 22 pp.

"Call for Proposals for 3D Audio," ISO/IEC JTC1/SC29/WG11/N13411, Jan. 2013, 20 pp.

Herre, et al., "MPEG-H 3D Audio—The New Standard for Coding of Immersive Spatial Audio," IEEE Journal of Selected Topics in Signal Processing, vol. 9, No. 5, Aug. 2015, pp. 770-779.

Poletti, "Three-Dimensional Surround Sound Systems Based on Spherical Harmonics," J. Audio Eng. Soc., vol. 53, No. 11, Nov. 2005, pp. 1004-1025.

Information technology—High efficiency coding and media delivery in heterogeneous environments—Part 3: Part 3: 3D Audio, Amendment 3: MPEG-H 3D Audio Phase 2, ISO/IEC JTC 1/SC 29N, Jul. 25, 2015, 208 pp.

Information technology—High efficiency coding and media delivery in heterogeneous environments—Part 3: 3D Audio, ISO/IEC JTC 1/SC 29N, Apr. 4, 2014, 337 pp.

"Information technology—High efficiency coding and media delivery in heterogeneous environments—Part 3: 3D Audio," ISO/IEC JTC 1/SC 29, Jul. 25, 2014, 433 pp.

Hollerweger, et al., "An Introduction to Higher Order Ambisonic," Oct. 2008, 13 pp.

Sen et al., "RM1-HOA Working Draft Text", MPEG Meeting; Jan. 13, 2014-Jan. 17, 2014; San Jose; (Motion Picture Expert Group or ISO/IEC JTC1/SC29/WG11), No. m31827, XP030060280, 83 pp.

"Information technology—High efficiency coding and media delivery in heterogeneous environments—Part 3: 3D Audio," ISO/IEC JTC 1/SC 29, ISO/IEC 23008-3:201x(E), Oct. 12, 2016, 797 pp (uploaded in parts).

"Information technology—High efficiency coding and media delivery in heterogeneous environments—Part 3: 3D Audio," ISO/IEC JTC 1/SC 29, ISO/IEC DIS 23008-3, Jul. 25, 2014, 311 pp.

Sen et al., "Technical Description of the Qualcomm's HOA Coding Technology for Phase II," ISO/IEC JTC/SC29/WG11 MPEG 2014/M34104, Jul. 2014, 4 pp.

Schonefeld, "Spherical Harmonics," Jul. 1, 2005, Accessed online [Jul. 9, 2013] at URL:http://videoarchts-inf.de/~volker/prosem_paper.pdf., 25 pp.

International Search Report and Written Opinion—PCT/US2018/033948—ISA/EPO—dated Sep. 26, 2018, 22 pp.

Partial International Search Report—PCT/US2018/033948—ISA/EPO—dated Jul. 24, 2018.

Wang Y-K., et al., "Viewport Dependent Processing in VR: Partial Video Decoding," 5. MPEG Meeting, May 30, 2016-Jun. 3, 2016, Geneva, (Motion Picture Expert Group or ISO/IEC JTC1/SC29/WG11), No. m38559, May 25, 2016 (May 25, 2016), XP030066915, 7 pages.

International Preliminary Report on Patentability—PCT/US2018/033948—ISA/EPO—dated Jan. 9, 2020 13 pgs.

* cited by examiner

AUDIO-DRIVEN VIEWPORT SELECTION

This application claims the benefit of U.S. Provisional Application No. 62/527,794, filed on 30 Jun. 2017, the entire content of which is hereby incorporated by reference.

TECHNICAL FIELD

This disclosure relates to processing of media data, such as audio data and/or video data.

BACKGROUND

A higher-order ambisonics (HOA) signal (often represented by a plurality of spherical harmonic coefficients (SHC) or other hierarchical elements) is a three-dimensional representation of a soundfield. The HOA or SHC representation may represent the soundfield in a manner that is independent of the local speaker geometry used to playback a multi-channel audio signal rendered from the SHC signal. The SHC signal may also facilitate backwards compatibility as the SHC signal may be rendered to well-known and highly adopted multi-channel formats, such as a 5.1 audio channel format or a 7.1 audio channel format. The SHC representation may therefore enable a better representation of a soundfield that also accommodates backward compatibility.

Additionally, digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, also referred to as High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure relates generally to using auditory aspects of the user experience of computer-mediated reality systems, including virtual reality (VR), mixed reality (MR), augmented reality (AR), computer vision, and graphics systems, to enhance the visual aspects of the user experience. In some particular examples, aspects of this disclosure are directed to using the directionality of audio data to predict particular portions of corresponding video data that is to be output at a greater resolution (or "upsampled") to enhance the user experience provided by the computer-mediated reality system.

In one example, a device includes a memory device configured to store audio spatial metadata associated with a soundfield and video data, and a processor coupled to the memory device. In this example, the processor is configured to identify one or more foreground audio objects of the soundfield using the audio spatial metadata stored to the memory device, and to select, based on the identified one or more foreground audio objects, one or more viewports associated with the video data. In this example, the device also includes display hardware coupled to the processor and the memory device, and the display hardware is configured to output a portion of the video data being associated with the one or more viewports selected by the processor.

In another example, a method includes identifying, by a processor coupled to the memory device, one or more foreground audio objects of a soundfield using audio spatial metadata stored to the memory device. In this example, the method further includes selecting, by the processor and based on the identified one or more foreground audio objects, one or more viewports associated with video data stored to the memory device. In this example, the method further includes outputting, by display hardware coupled to the processor and the memory device, a portion of the video data being associated with the one or more viewports selected by the processor.

In another example, an apparatus includes means for identifying one or more foreground audio objects of a soundfield using audio spatial metadata, means for selecting, based on the identified one or more foreground audio objects, one or more viewports associated with video data, and means for outputting, a portion of the video data being associated with the selected one or more viewports selected by the processor.

In another example, a computer-readable storage medium is encoded with instructions that, when executed, cause a processor to identify one or more foreground audio objects of the soundfield using the audio spatial metadata stored to the memory device, and to select, based on the identified one or more foreground audio objects, one or more viewports associated with the video data. In this example, the instructions, when executed, further cause the processor to output, via display hardware, a portion of the video data being associated with the one or more viewports selected by the processor.

The details of one or more examples of this disclosure are set forth in the accompanying drawings and the description below. Other features, objects, and advantages will be apparent from the description and drawings, and from the claims.

DETAILED DESCRIPTION

Figure 1:
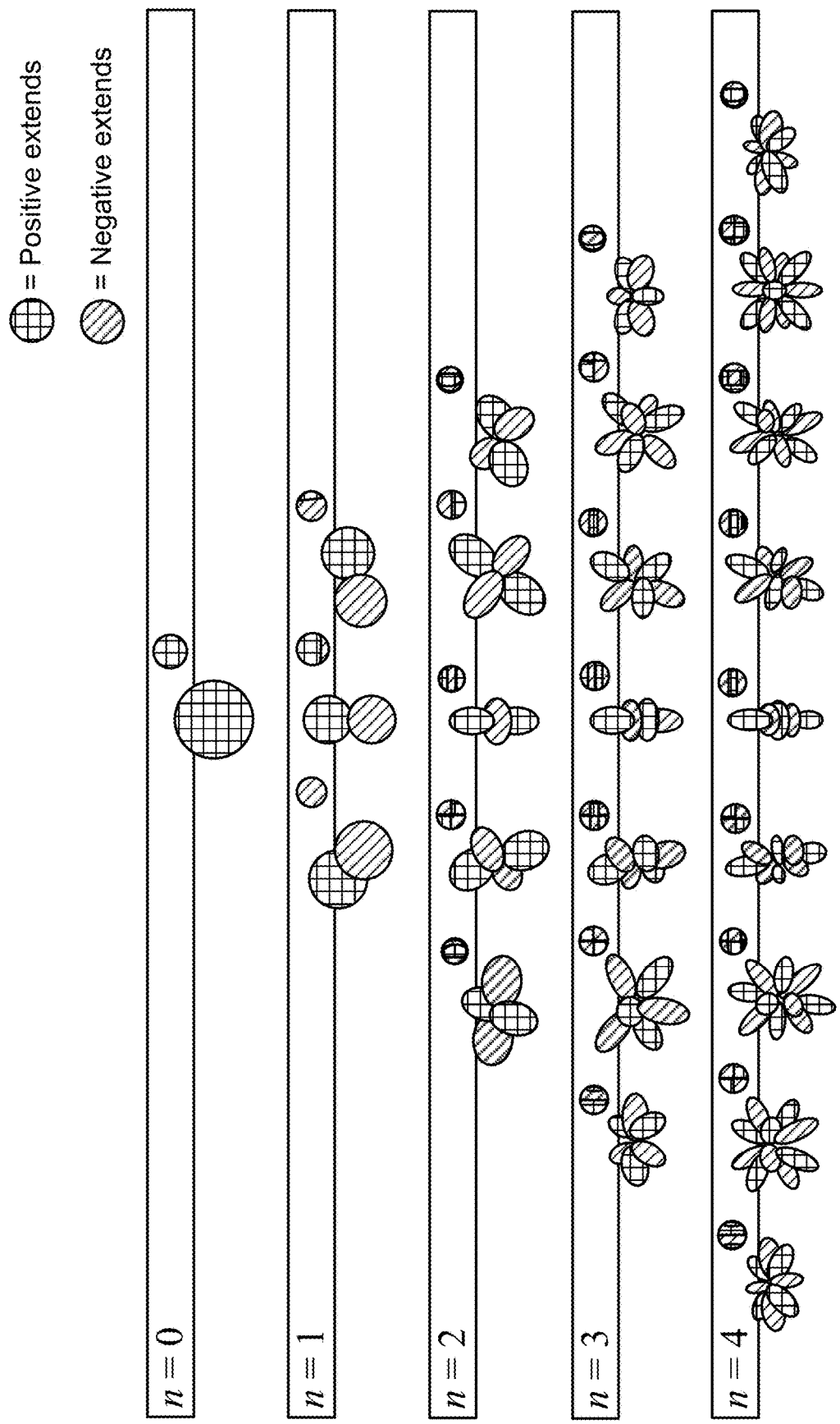
FIG. 1 is a diagram illustrating spherical harmonic basis functions of various orders and sub-orders.

In general, this disclosure is directed to techniques for predictively selecting one or more viewing areas (or "viewports") at which to upsample video data to be displayed during a user experience of a computer-mediated reality system. Computer-mediated reality technology includes various types of content-generating and content-consuming systems, such as virtual reality (VR), mixed reality (MR), augmented reality (AR), computer vision, and graphics systems. While several aspects of this disclosure are described with respect to virtual reality systems for ease of discussion by way of example, it will be appreciated that the techniques of this disclosure are also applicable to other types of computer-mediated reality technology, such as mixed reality, augmented reality, computer vision, and graphics systems.

Virtual reality systems may leverage a user's field of view (FoV) information to edit and output spherical video data that is customized to serve the user's FoV. Spherical video data refers to video data that partially or fully surrounds a viewer's head, e.g., for virtual reality applications or other similar scenarios in which a user may move his or her head to see different parts of an image canvas that cannot be seen when directing focus at a single point of the canvas. In particular, these techniques may be applied when the viewer directs visual focus to a particular portion of a large canvas, such as a three-dimensional canvas that partially or fully envelops the viewer's head. Spherical video data that envelops a user's head may be provided using a combination of screens (e.g., a set of screens that surround the user) or via head-mounted optics.

Examples of hardware that can provide head-mounted optics include VR headsets, MR headsets, AR headsets, and various others. Sensing data and/or test data may be used to determine the users' FoV. As one example of sensing data, one or more angles associated with the positioning of a VR headset, which form a "steering angle" of the headset, may indicate the user's FoV. As another example of sensing data, a gaze angle of the user (sensed, for example, via iris detection) may indicate the user's FoV.

The spherical video data and the corresponding audio data may be encoded and prepared (e.g., for storage and/or transmission) using a set of characteristics. With respect to spherical video data, the data may be encoded and prepared using characteristics such as spatial resolutions for different regions of the canvas, bitrates for different regions of the 3D canvas (which may be achieved using various quantization parameters), or the like. For instance, the spherical video data may be upsampled at one or more surfaces of the 3D canvas that are in the user's FoV, to enhance the visual aspects of the user experience. Each surface of the 3D canvas is referred to herein as a respective "viewport."

Existing VR systems select viewports for upsampling in a reactive manner. That is, existing VR systems first determine the user's FoV (e.g., by discerning the steering angle of the VR headset, by tracking the user's eye gaze, etc.) and then upsample the video data being displayed at the FoV viewport. As such, the existing VR systems provide a user experience in which a user views a lower-than-full resolution video at the FoV viewport for some length of time, while the video displayed at the FoV viewport is awaiting or undergoing upsampling. Thus, the user may experience some lag time while the FoV viewport is upsampled, according to existing VR systems.

With respect to the auditory component of the user experience, many state-of-the-art VR systems render and play back a full HOA representation of the 3D soundfield throughout the VR experience. As such, in many cases, VR systems playback surround sound audio with fully directional audio objects. Thus, according to these VR systems, the audio playback is not subject to quality fluctuations, as in the case of video data that is displayed at various viewports of the 3D canvas, including any newly-designated FoV viewport.

This disclosure is directed to techniques for predicting that a viewport will be the FoV viewport before the user's gaze shifts to the new FoV viewport. The techniques of this disclosure use the directionality and energy of various audio objects represented in the HOA-represented soundfield to predict FoV viewport transitions. Because the VR systems have prior access to the entirety of the soundfield representation, the VR systems of this disclosure may leverage already-available audio data to predict the designation of an FoV viewport, without having to rely on an after-the-fact determination of the user's gaze having shifted to the new FoV viewport. In this way, the VR systems of this disclosure may mitigate or potentially eliminate the upsampling lag time of existing systems, by preemptively upsampling the video data at one or more predicted FoV viewport candidates.

For instance, the HOA representation of the soundfield may determine that the location information for the most energy-predominant ("foreground") audio objects tends to coincide with or be close to the viewport-location where the VR story is focused. The location information represents "spatial metadata" or "audio spatial metadata" with respect to the foreground audio objects. As such, this disclosure describes VR systems that use the location information of energy-predominant audio objects to predict FoV viewport transitions.

For instance, a VR client device of this disclosure may leverage the spatial metadata of foreground audio objects in the HOA representation of the soundfield to predictively upsample the video feed at one likely-next FoV viewport or at a plurality of possibly-next viewports. That is, a VR client of this disclosure may use the audio spatial metadata to predict the possibly-next viewport(s) to which the user's attention will be called. In the case of the audio spatial metadata being associated with video data that spans multiple possibly-next viewports, the VR client may also predict a number of possibly-next viewports using the audio spatial metadata of the soundfield.

VR client devices of this disclosure can commence and possibly even finish the upsampling before the user shifts his/her view to the next FoV viewport or to an interfacing area of two or more possibly-next viewports. In this way, the VR client devices of this disclosure may enhance the user experience provided by VR systems, because FoV viewports are partially or fully upsampled before the user shifts his/her gaze to the FoV viewport. Because the HOA representation of the soundfield was previously generated using scene analysis, the predictive viewport selection aspects of this disclosure do not introduce additional scene analysis processes that could potentially consume computing resources.

Although described above with respect to audio spatial metadata of an HOA representation of a soundfield, the predictive viewport selection techniques of this disclosure can be performed based on other representations of a soundfield, as well. For example, a VR client can implement the techniques of this disclosure to predictively select one or more possibly-next viewports by using object metadata of an object-based representation of the soundfield. As such, the VR systems of this disclosure may perform predictive viewport selection for the video feed, based on spatial metadata of foreground audio objects in audio feeds of various formats.

The techniques of this disclosure may be used in conjunction with techniques related to transmission (e.g., sending and/or receiving) of media data (such as video data and audio data) coded at various levels of quality for different regions at which the media data is to be played back. For example, the techniques of this disclosure may be used by a client device that includes a panoramic display (e.g., a display that partially or fully envelopes a viewer) and surround sound speakers. In general, the display is configured such that a visual focus of a user is directed to only a portion of the display at a given time. The systems of this disclosure may render and output the audio data via the surround sound speakers such that audio objects associated with the present area of focus on the display are output with greater directionality than the remaining audio objects.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

The SHC $A_n^m(k)$ can either be physically acquired (e.g., recorded) by various microphone array configurations or, alternatively, they can be derived from channel-based or object-based descriptions of the soundfield. The SHC represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k)=g(\omega)(-4\pi ik)h_n^{(2)}(kr_s)Y_n^{m*}(\theta_s,\varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) allows us to convert each PCM object and the corresponding location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$. The remaining figures are described below in the context of object-based and SHC-based audio coding.

Figure 2:
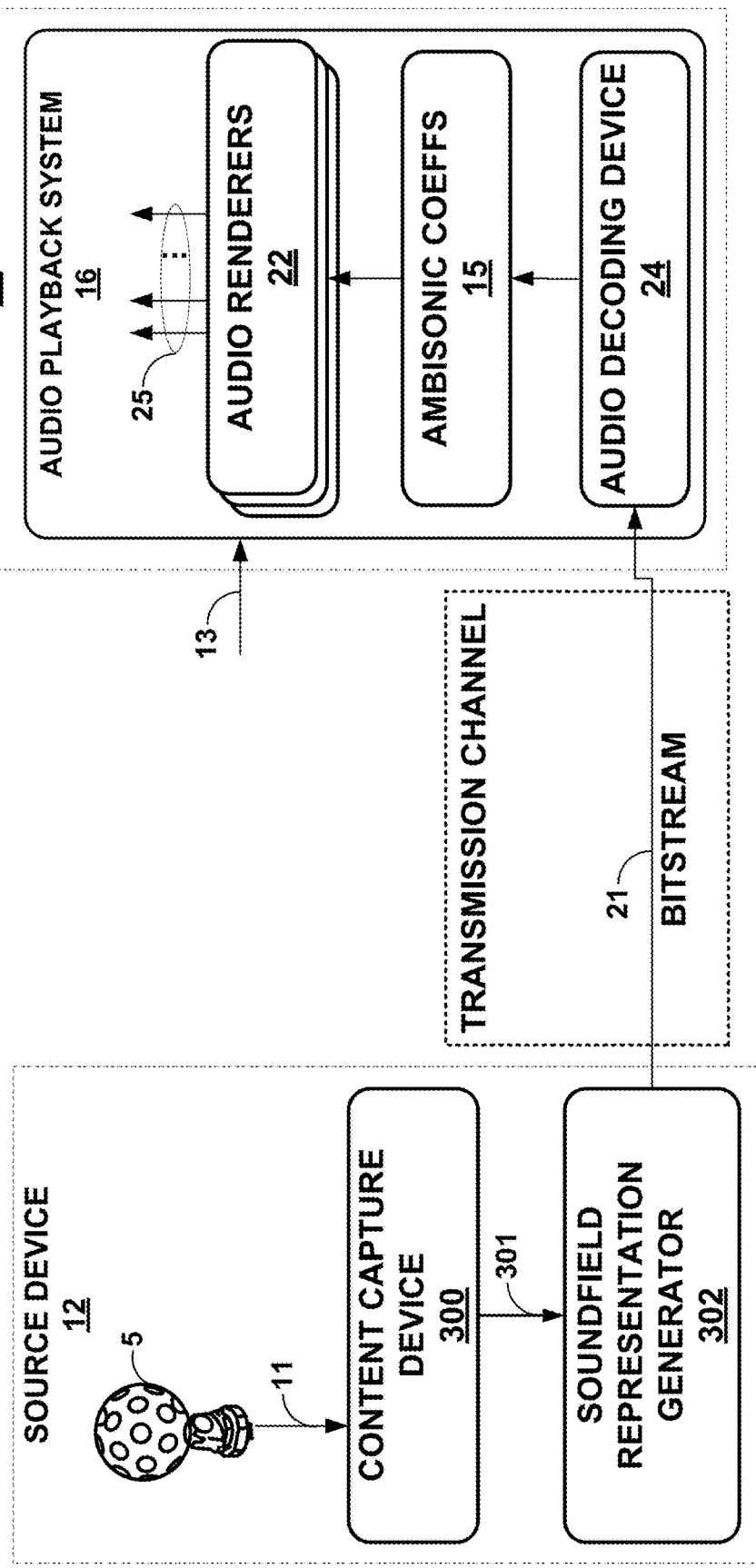
FIG. 2 is a diagram illustrating a system that may perform various aspects of the techniques described in this disclosure.

FIG. 2 is a diagram illustrating a system 10 that may perform various aspects of the techniques described in this disclosure. As shown in the example of FIG. 2, the system 10 includes a source device 12 and a content consumer device 14. While described in the context of the source device 12 and the content consumer device 14, the techniques may be implemented in any context in which any hierarchical representation of a soundfield is encoded to form a bitstream representative of the audio data. Moreover, the source device 12 may represent any form of computing device capable of generating hierarchical representation of a soundfield, and is generally described herein in the context of being a VR content creator device. Likewise, the content consumer device 14 may represent any form of computing device capable of implementing the soundfield representation selection techniques described in this disclosure as well as audio playback, and is generally described herein in the context of being a VR client device.

The source device 12 may be operated by an entertainment company or other entity that may generate multi-channel audio content for consumption by operators of content consumer devices, such as the content consumer device 14. In many VR scenarios, the source device 12 generates audio content in conjunction with video content. The source device 12 includes a content capture device 300 and a content capture assistant device 302. The content capture device 300 may be configured to interface or otherwise communicate with a microphone 5. The microphone 5 may represent an Eigenmike® or other type of 3D audio microphone capable of capturing and representing the soundfield as HOA coefficients 11. The content capture device 300 may, in some examples, include an integrated microphone 5 that is integrated into the housing of the content capture device 300. In some examples, the content capture device 300 may interface wirelessly or via a wired connection with the microphone 5. In other examples, the content capture device 300 may process HOA coefficients 11 that after HOA coefficients 11 are input via some type of removable storage. Various combinations of the content capture device 300 and the microphone 5 are possible in accordance with this disclosure.

The content capture device 300 may also be configured to interface or otherwise communicate with the soundfield representation generator 302. The soundfield representation generator 302 may include any type of hardware device capable of interfacing with the content capture device 300. The soundfield representation generator 302 may use HOA coefficients 11 provided by the content capture device 300 to generate a full HOA representation of the soundfield using the full set of HOA coefficients 11.

The content capture device 300 may, in some examples, be configured to wirelessly communicate with the soundfield representation generator 302. In some examples, the content capture device 300 may communicate, via one or both of a wireless connection or a wired connection, communicate with the soundfield representation generator 302. Via the connection between the content capture device 300 and the soundfield representation generator 302, the content capture device 300 may provide content in various forms of content, which, for purposes of discussion, are described herein as being portions of the HOA coefficients 11.

In some examples, the content capture device 300 may leverage various aspects of the soundfield representation generator 302 (in terms of hardware or software capabilities of the soundfield representation generator 302). For example, the soundfield representation generator 302 may include dedicated hardware configured to (or specialized software that when executed causes one or more processors to) perform psychoacoustic audio encoding (such as a unified speech and audio coder denoted as "USAC" set forth by the Motion Picture Experts Group (MPEG)). The content capture device 300 may not include the psychoacoustic audio encoder dedicated hardware or specialized software and instead provide audio aspects of the content 301 in a non-psychoacoustic-audio-coded form. The soundfield representation generator 302 may assist in the capture of content 301 by, at least in part, performing psychoacoustic audio encoding with respect to the audio aspects of the content 301.

The soundfield representation generator 302 may also assist in content capture and transmission by generating one or more bitstreams 21 based, at least in part, on the audio content generated from the HOA coefficients 11. The bitstream 21 may represent a compressed version of the HOA coefficients 11 (e.g., as a fully directional 3D audio soundfield) and any other different types of the content 301 (such as a compressed version of spherical video data, image data, or text data). The soundfield representation generator 302 may generate the bitstream 21 for transmission, as one example, across a transmission channel, which may be a wired or wireless channel, a data storage device, or the like. The bitstream 21 may represent an encoded version of the HOA coefficients 11 and may include a primary bitstream and another side bitstream, which may be referred to as side channel information.

The content consumer device 14 may be operated by an individual, and may represent a VR client device in many examples. The content consumer device 14 may include an audio playback system 16, which may refer to any form of audio playback system capable of rendering SHC (whether in form of third order HOA representations and/or MOA representations) for playback as multi-channel audio content.

While shown in FIG. 2 as being directly transmitted to the content consumer device 14, the source device 12 may output the bitstream 21 to an intermediate device positioned between the source device 12 and the content consumer device 14. The intermediate device may store the bitstream 21 for later delivery to the content consumer device 14, which may request the bitstream. The intermediate device may comprise a file server, a web server, a desktop computer, a laptop computer, a tablet computer, a mobile phone, a smart phone, or any other device capable of storing the bitstream 21 for later retrieval by an audio decoder. The intermediate device may reside in a content delivery network capable of streaming the bitstream 21 (and possibly in conjunction with transmitting a corresponding video data bitstream) to subscribers, such as the content consumer device 14, requesting the bitstream 21.

Alternatively, the source device 12 may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content stored to the mediums are transmitted (and may include retail stores and other store-based delivery mechanism). In any event, the techniques of this disclosure should not therefore be limited in this respect to the example of FIG. 2.

As further shown in the example of FIG. 2, the content consumer device 14 includes the audio playback system 16. The audio playback system 16 may represent any audio playback system capable of playing back multi-channel audio data. The audio playback system 16 may include a number of different renderers 22. The renderers 22 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16 may further include an audio decoding device 24. The audio decoding device 24 may represent a device configured to decode ambisonic coefficients 15 from the bitstream 21. As such, the ambisonic coefficients 15 may be similar to a full set or a partial subset of the HOA coefficients 11, but may differ due to lossy operations (e.g., quantization) and/or transmission via the transmission channel. The audio playback system 16 may, after decoding the bitstream 21 to obtain the Ambisonic coefficients 15 and render the Ambisonic coefficients 15 to output loudspeaker feeds 25. The loudspeaker feeds 25 may drive one or more loudspeakers (which are not shown in the example of FIG. 2 for ease of illustration purposes).

To select the appropriate renderer or, in some instances, generate an appropriate renderer, the audio playback system 16 may obtain loudspeaker information 13 indicative of a number of loudspeakers and/or a spatial geometry of the loudspeakers. In some instances, the audio playback system 16 may obtain the loudspeaker information 13 using a reference microphone and driving the loudspeakers in such a manner as to dynamically determine the loudspeaker information 13. In other instances, or in conjunction with the dynamic determination of the loudspeaker information 13, the audio playback system 16 may prompt a user to interface with the audio playback system 16 and input the loudspeaker information 13.

The audio playback system 16 may then select one of the audio renderers 22 based on the loudspeaker information 13. In some instances, the audio playback system 16 may, when none of the audio renderers 22 are within some threshold similarity measure (in terms of the loudspeaker geometry) to the loudspeaker geometry specified in the loudspeaker information 13, generate the one of audio renderers 22 based on the loudspeaker information 13. The audio playback system 16 may, in some instances, generate one of the audio renderers 22 based on the loudspeaker information 13 without first attempting to select an existing one of the audio renderers 22. One or more speakers may then playback the rendered loudspeaker feeds 25.

Figure 3A:
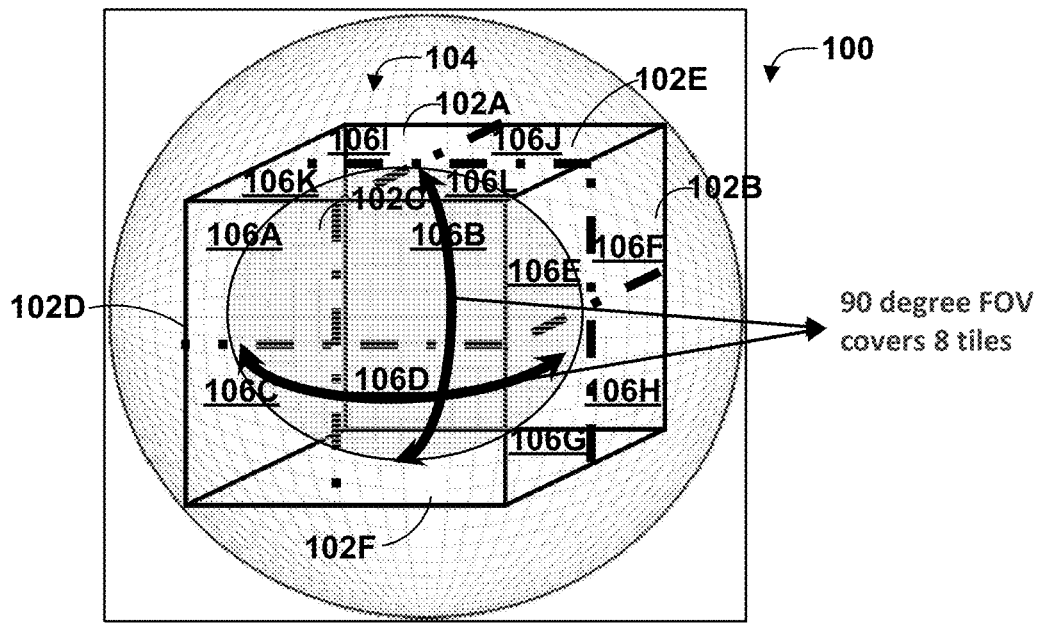
FIGS. 3A and 3B are diagrams illustrating representations of models for displays used to present panoramic video data.
Figure 3B:
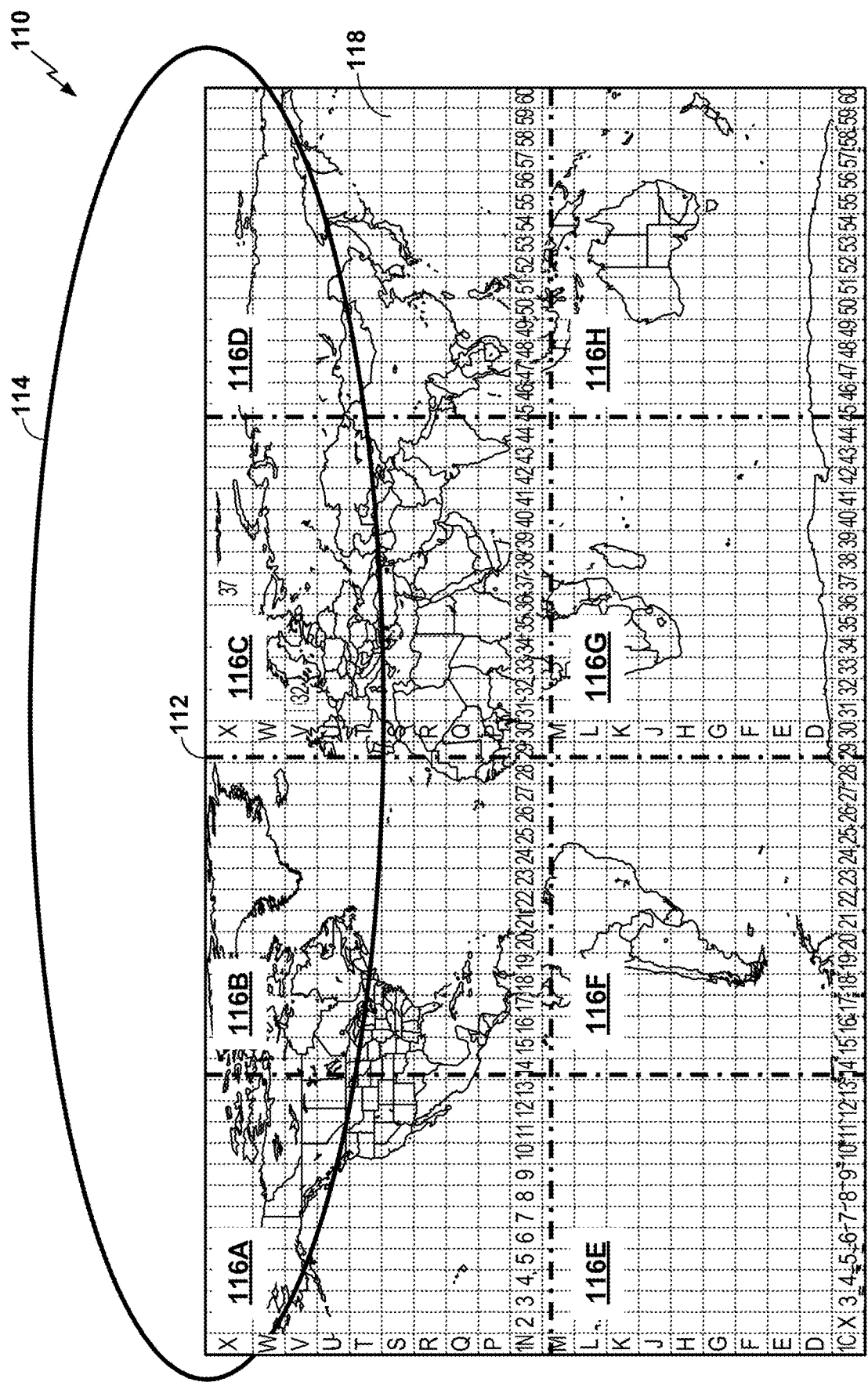

FIGS. 3A and 3B are diagrams illustrating representations of models for displays used to present panoramic video data. FIG. 3A illustrates an example of a cube map projection 100, while FIG. 3B illustrates equi-rectangular projection 110.

In FIG. 3A, each of six faces 102A-102F (faces 102) of a cube (or cuboid) 104 is divided into four tiles (for a total of 24 tiles). The faces 102 may conceptually represent the inside surfaces of the cube 104. Tiles of visible faces (i.e., faces 102A, 102B, and 102C) are labeled as tiles 106A-106L. In particular, face 102C is divided into tiles 106A-106D, face 102B is divided into tiles 106E-106H, and face 102A is divided into tiles 106I-106L. The tiles of the hidden faces (i.e., faces 102D, 102E, and 102F) are unlabeled in FIG. 3A for purposes of readability, but it should be understood that the faces 102D-102F are also divided into tiles. "Tiles" may also be referred to as regions. Each of cube faces 102 in FIG. 3A corresponds to a 90 degree by 90-degree field of view (FoV). Any arbitrary 90×90 degree tile of the sphere may require decoding of $\frac{1}{3}^{rd}$ of the panorama at high resolution. The FoV rarely spans more than eight tiles. Thus, the span of high resolution decode can be restricted to eight tiles or less, without losing visual quality.

FIG. 3B illustrates canvas 118, which is divided into eight tiles 116A-116H. In this example, when a user is looking at the "poles" of the sphere (e.g., north pole 112, where the user's field of view when looking at north pole 112 is represented by grey shaded area 114), the entire upper half of canvas 118 (i.e., tiles 116A-116D) would need to be decoded at high resolution. Breaking tiles 116A-116D up into more vertical tiles would not help to solve the problem. Thus, in this example, half of the panorama would need to be decoded at high resolution. This is significantly more high-resolution data than in the example of FIG. 3A. Therefore, the techniques of this disclosure may use cube map projection model 100 for the display.

Referring to the example discussed with respect to FIG. 1 above, in which video data is coded at resolutions including 6 k, 4 k, HD (1080p), and 720p, in FIG. 3A, front four tiles 106A-106D (also referred to as "regions") may be decoded at 6 k resolution, neighboring eight tiles (e.g., tiles 106E, 106G, 106K, and 106L, as well as the unlabeled tiles of faces 102D and 102F that neighbor tiles 106A, 106C, and 106D) may be decoded at 4 k resolution, neighboring eight tiles to these eight tiles (i.e., tiles 106F, 106H, 106I, 106J, and the other unlabeled tiles that neighbor the tiles that neighbor tiles 106A, 106C, and 106D) may be decoded at HD (1080p) resolution, and the four back tiles may be decoded at 720p resolution. In this example, the total bandwidth requirement for such video data would be 6.5 MP per frame. In a worse-case scenario in which there is an 8-4-4-8 distribution of tiles across the resolutions in decreasing order, there would be 8.17 MP per frame. It will be appreciated that the video resolutions/rates described above are non-limiting examples, and that other video resolutions/rates are also compatible with various aspects of this disclosure. It will also be appreciated that video resolutions/rates are subject to change as technology and standards evolve.

Figure 4:
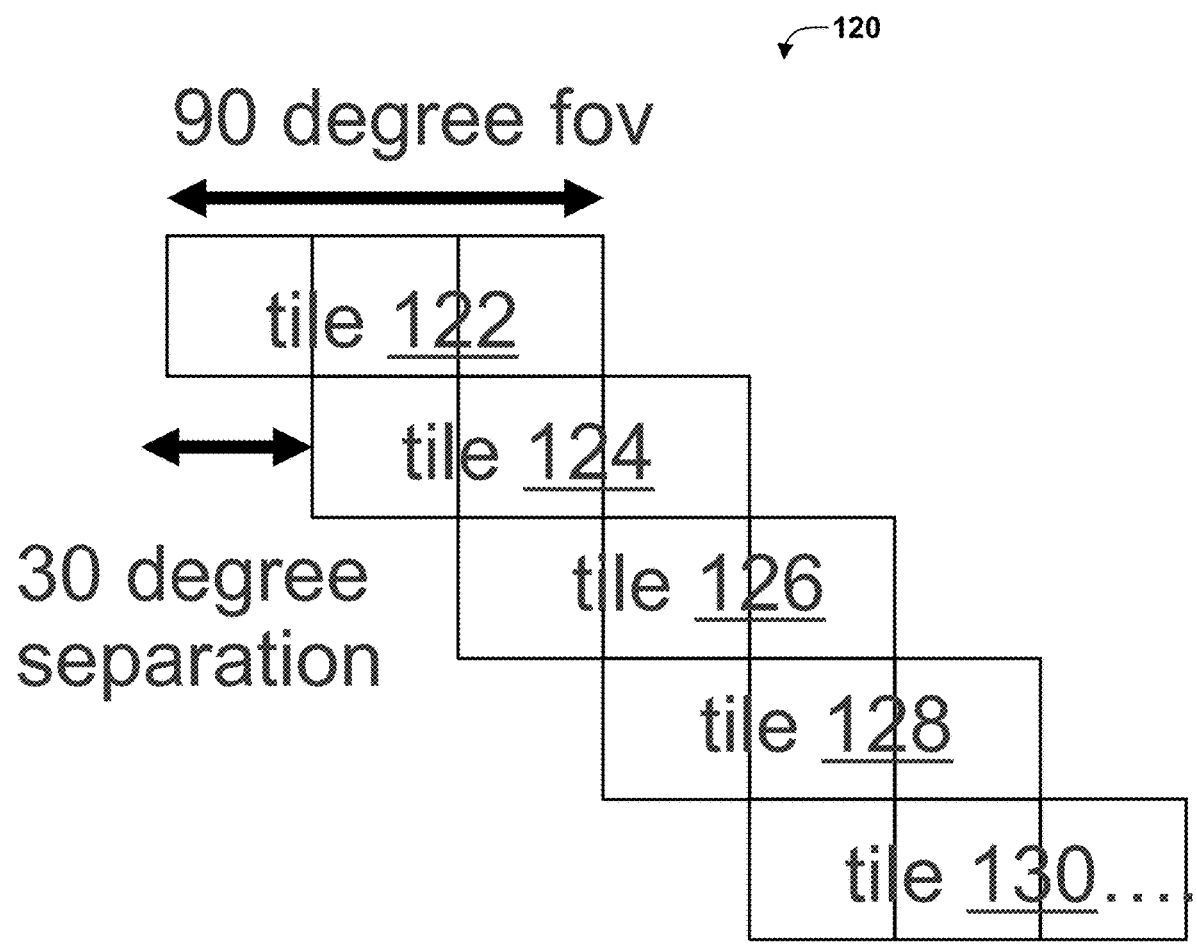
FIG. 4 is a diagram illustrating an example of cylindrical panorama video data.

FIG. 4 is a diagram illustrating an example of cylindrical panorama video data 120. Cylindrical panorama video data 120 is partitioned into tiles 122-130. Bit rate reductions may be equally, if not more, important for certain uses than reductions in decoder complexity. For example, some reports indicate that the average U.S. Internet connection speed is 5 mbps, compared to a 30 mbps requirement for conventional, high quality panoramic video data. Carving up multiple small tiles from the panorama may reduce compression efficiency. That is, there may be some loss in temporal prediction efficiency.

In the example of FIG. 4, the server (e.g., source device 12 of FIG. 2) may store 12×90 degree tiles 122-130 (which is equivalent to three copies of the panorama). This example may be used to avoid small tiles, which means that compression efficiency is not compromised. In addition, 12×30 degree tiles may also be stored. An arbitrary 90-degree view would then require at the most four 30 degree tiles, where one 30-degree tile and one 90-degree tile can be used to compose an arbitrary 90-degree view.

A bitrate optimization for spherical panorama video data 120 may be achieved using the techniques of this disclosure. The idea of trading off storage space to save bitrate can be generalized to other cases. For instance, it is not necessary that same tile granularity is available at all the viewing angles. Unlike the cylindrical panorama case, covering all the viewpoints with equal tile granularity is not trivial for spherical panoramas.

In general, source device 12 of FIG. 2 may save copies of spherical panorama video data 120 at multiple tile granularities. Bigger tiles than tiles 122-130 (not shown) can have overlapping fields of views between them in some places for better coverage. For example, source device 12 may encode the most interesting viewpoints (as determined by a user, such as an administrator, who is preparing the content) at larger tile sizes. In this manner, source device 12 may send a combination of multiple sized tiles, e.g., a large tile (e.g., four times the tile size of one of tiles 122-130) for a region at which a visual focus of a user is directed, and smaller tiles for the other remaining regions (for a total of 21 tiles, with respect to the example of FIG. 3A).

An example tile coding in the cuboidal projection may be as follows: cube faces may be A, B, C, and D, forming the horizontal ring, E for the top, and F for the bottom. The smallest tiles may be A1, A2, A3, A4, B1, B2, . . . , F1, F2, F3, and F4 (for a total of 24 tiles). The larger tiles may be A, B, C, D, E, and F (where tile A covers the area spanned by tiles A1, A2, A3, and A4, B covers the area spanned by tiles B1, B2, B3, and B4, and so on for each of tiles C-F). In some examples, only those viewpoints which are more likely to be viewed would be coded at larger tile sizes. Thus, if it is unlikely that a user would look up or down, only A, B, C, and D could be coded as large tiles. Optionally, each of these tiles may have left and right views for stereo video data.

Source device 12 may prepare the video data for a stereo video case to improve latency when destination device 14 switches from a low-resolution stream to a high-resolution stream. The techniques of this disclosure may avoid introduction of additional motion to photon (m2p) latency. In general, latency during the transition from, e.g., low resolution to high resolution (when the user moves his/her head) can be large. The maximum latency is equal to the latency from a heads-up display (HUD) to server and back (e.g., the roundtrip latency between destination device 14 and server device 12) plus the length of a GOP structure or time until next I-frame is decoded. However, the scenario where content at different resolutions is available at the HUD (either stored locally in a file or streamed) causes the network delay portion to be 0 in the maximum latency calculation above.

Figure 5:
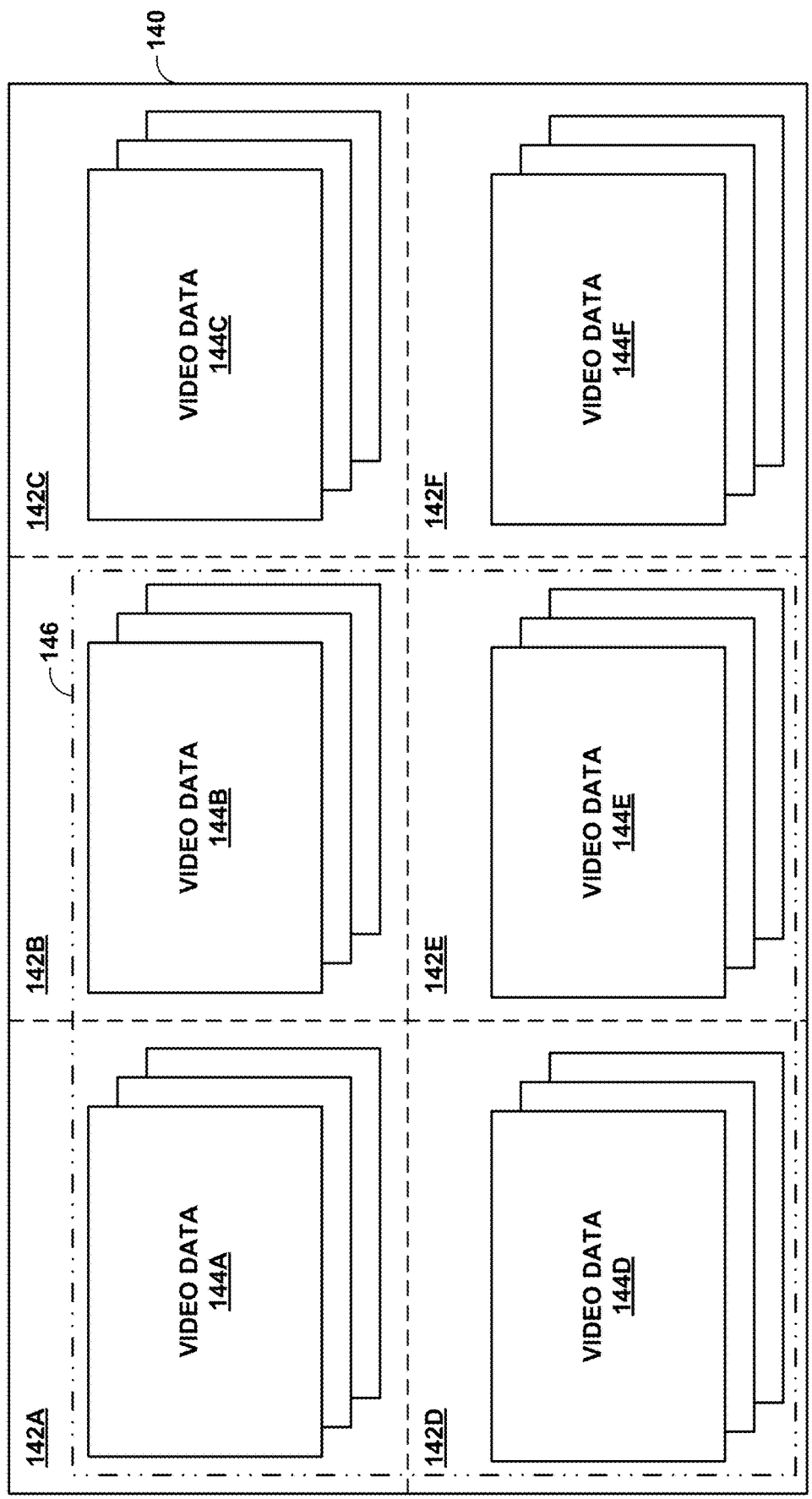
FIG. 5 is a diagram illustrating an example 3D canvas divided into regions.

FIG. 5 is a diagram illustrating an example canvas 140 divided into regions 142A-142F (regions 142). For purposes of discussion, canvas 140 is divided as a rectangle into rectangular regions 142, although it should be understood that this discussion may apply to a cube map projection similar to cube map projection 100 as shown in FIG. 3A.

In accordance with the techniques of this disclosure, various sets of video data may be provided for each of regions 142. In the example of FIG. 5, video data 144A is provided for region 142A, video data 144B is provided for region 142B, video data 144C is provided for region 142C, video data 144D is provided for region 142D, video data 144E is provided for region 142E, and video data 144F is provided for region 142F. Each of video data 144A-144F may include video data encoded at a variety of quality levels, e.g., spatial resolutions. For example, each of video data 144A-144F may include video data encoded at proportional 6K resolution (that is, having pixel density of 6K resolution), 4K resolution, 1080 P resolution, and 720 P resolution.

In some examples, video data may be provided that covers a plurality of regions 142. In the example of FIG. 5, video data 146 is provided that covers regions 142A, 142B, 142D, and 142E. Thus, if a user's focus is directed at a field of view including regions 142A, 142B, 142D, and 142E, destination device 14 may simply retrieve video data 146, rather than retrieving individual sets of video data from video data 144A, 144B, 144D, 144E. In some examples (such as that shown in FIG. 5), only a single quality (e.g., spatial resolution) is provided that covers multiple regions, although in other examples, multiple qualities may be provided for multiple regions.

Figure 6:
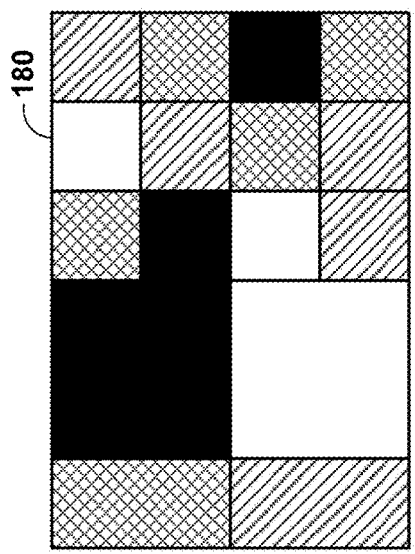
FIG. 6 is a diagram illustrating a correspondence between an example 3D canvas and corresponding cube map views.
Figure 6:
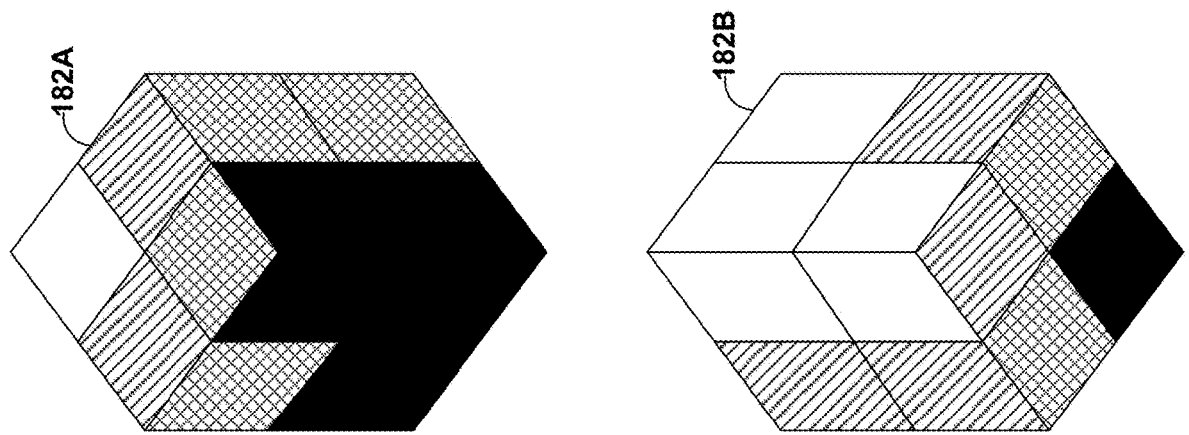

FIG. 6 is a diagram illustrating a correspondence between an example canvas 180 and corresponding cube map views 182A, 182B. In particular, canvas 180 includes a plurality of tiles that are differently shaded, where different shading represents different quality levels (e.g., spatial resolutions) that are requested. Cube map views 182A, 182B represent where each of the tiles of canvas 180 would be displayed. Cube map view 182A shows a front perspective view of front views of the cube map, while cube map view 182B shows a cut-away front perspective of rear tiles of the cube map. White tiles represent a highest quality level (e.g., highest spatial resolution), diagonally shaded tiles represent a second highest quality level, cross-hatch shaded tiles represent a third highest quality level, and solid black shaded tiles represent a lowest quality level. The quality levels may also be referred to as "layers."

In one example, to achieve lower quality levels, spatial resolution is downsampled. For example, layer 1 may be full spatial resolution, layer 2 may be spatially reduced by one-half in the horizontal and vertical directions (for a total of one-quarter spatial resolution), layer 3 may be spatially reduced by one-third in the horizontal and vertical directions (for a total of one-ninth spatial resolution), and layer 4 may be spatially reduced by one-fourth in the horizontal and vertical directions (for a total of one-sixteenth spatial resolution).

Figure 7:
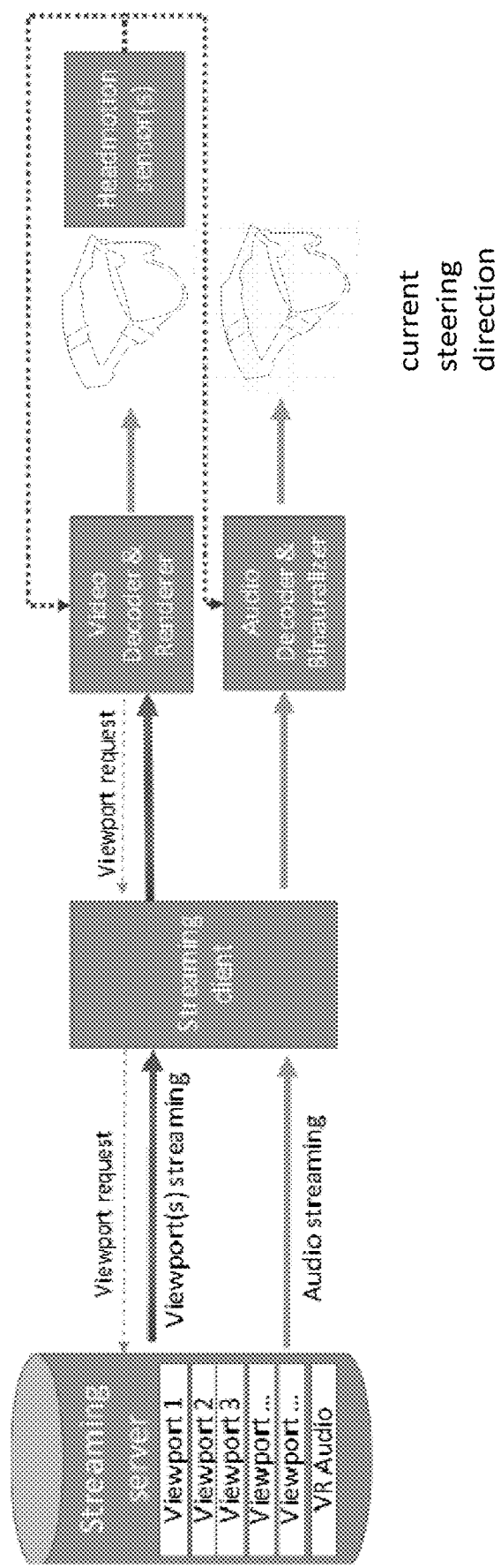
FIG. 7 is a diagram illustrating aspects of this disclosure according to which a streaming server may provide an HOA representation of a soundfield to a streaming client.

FIG. 7 is a diagram illustrating aspects of this disclosure according to which a streaming server may provide an HOA representation of a soundfield to a streaming client. The streaming server of FIG. 7 is an example of the source device 12 of FIG. 2, while the streaming client of FIG. 7 is an example of the content consumer device 14 of FIG. 2.

The auditory aspects form a significant portion of the user experience of a VR story. Some studies have concluded that audio forms sixty percent (60%) of the user experience with respect to the presentation of a VR story. The audio data of a VR story is often stored and/or streamed with full 360° audio resolution. As such, a user of the streaming client may perceive sound from any (or potentially all) sound source locations. Because of the audio spatial metadata that describes the audio objects of the audio data, in the context of VR storytelling, directional audio is often used to guide the user through the VR story. Aspects of the audio portion of a VR storytelling experience are described in "Directing Attention in 360° Video" available at http://digital-library-.theiet.org/content/conferences/10.1049/ibc.2016.0029.

According to existing VR technologies, one common approach for VR video streaming is to encode the video into different viewports. The user can typically see only approximately a 120° portion of the video data. Thus, the streaming client (e.g., the VR client) may output the FOV viewport(s) at the highest available resolution, such as a 6 K resolution. Meanwhile, the VR client may concurrently output the remaining viewports (which are not in the FOV) at lower resolutions. For instance, the VR client may use an intermediate resolution such as 4 K or 1080 p for viewports that are adjacent to the FOV viewport(s). The VR client may use a lowest available resolution (e.g., 720p) for a viewport that is positioned opposite to the current FOV viewport. Upon detecting a change in the steering angle of the headset, the VR client may reassign the resolutions among the viewports to better suit the new FOV information. As described above, the resolution reassignment generally comes with a lag time according to existing VR technology, during which the FOV viewport goes through upsampling.

Figure 8:
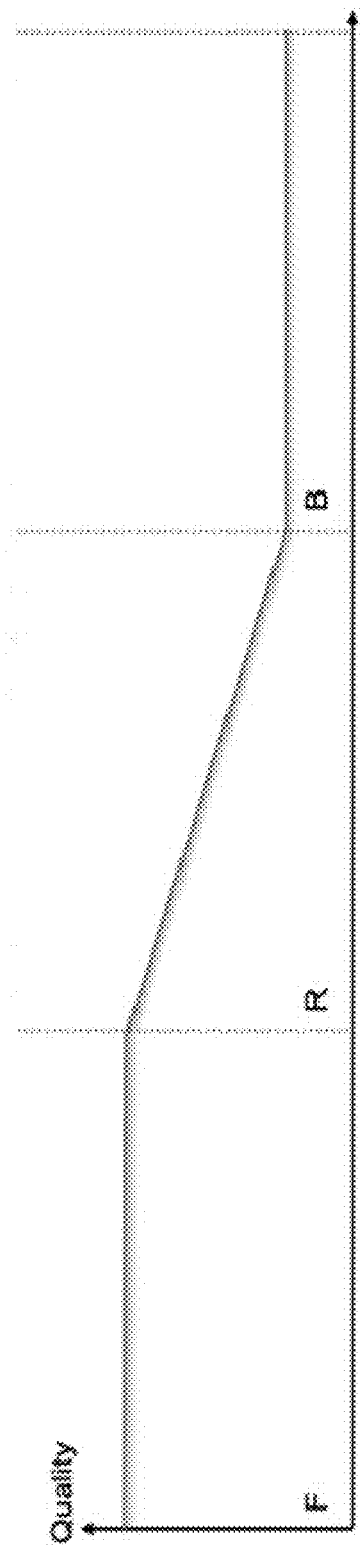
FIG. 8 is a graph illustrating a comparison of video resolution between a field of view (FoV) viewport, a viewport that is adjacent to the FoV, and a viewport that is opposite to the FoV viewport.

FIG. 8 is a graph illustrating a comparison of video resolution between an FoV viewport (labeled 'F' for 'front'), a viewport that is adjacent to the FoV (labeled 'R' for 'fight'), and a viewport that is opposite to the FoV viewport (labeled 'B' for 'back'). As described above, the state-of-the-art VR streaming approaches are based on identifying FoV information using a steering angle of a VR headset. To save bandwidth and computing resources, the VR client device may provide the highest available video quality at the FoV viewport(s), while providing lower video quality at the remaining viewports that the VR client determines are outside of the user's FoV. When the user changes viewing direction (which the VR client may detect using the steering angle of the user's VR headset or by using gaze tracking of the user's iris), the processing and transmission latency may switch to the new viewport stream. During this transition time, the user watches a lower quality video quality (e.g., being blocky or pixelated due to the video including relatively big pixels).

The techniques of this disclosure reduce or potentially eliminate the transition time, from the user's standpoint, of watching degraded video quality upon switching the user's FoV. In some examples, the techniques of this disclosure enable the VR client to predict one or more possibly-next FoV viewports, and to thereby prefetch and preemptively upsample the video data that is displayed via the likely-next viewport(s). It will be appreciated that the techniques of this disclosure support selecting the likely-next viewport(s)

based on the audio analysis, or a combination of the audio analysis and one or more other criteria, as well.

Said another way, the VR client of this disclosure may predict one or more likely-next viewport(s) to which the user may shift the FoV, based on auditory cues in the 3D audio soundfield of the VR audiovisual data. The VR clients of this disclosure may predict the possibly-next viewport(s) based on the theory or assumption that a user is likely to pay (e.g. shift) attention towards the video location that matches the directionality of the energy-predominant sounds in the corresponding scene. For instance, the user may rotate or otherwise move his/her gaze towards the location of the energy-predominant sounds in the next scene(s).

Scene-based HOA is presently a commonly-used audio format for VR technology. Various HOA coding technologies decompose an audio scene into predominant foreground and background components. As such, the audio decoder of the VR client device may already have the directional information of the predominant sounds, by way of the audio spatial metadata that describes the directionality of the sounds. As such, the VR client may leverage the functionality of the audio decoder (e.g., the audio decoding device 24 of FIG. 2) to predict the possibly-next viewport(s) of the VR video consumption by the user.

In other examples, the VR clients of this disclosure may leverage scene-based audio (i.e., HOA) in addition to one or more audio objects. That is, the techniques of this disclosure enable the VR clients of this disclosure to use spatial information of various types of audio formats, including object-based formats, to predict possibly-next viewport(s) of the VR video output. In the case of an object-based representation of the soundfield, the VR client of this disclosure may use metadata of the audio objects for viewport prediction.

Within a given video frame, video objects may be distinguished based on their association with foreground or background audio objects of a corresponding audio frame. In such an illustration, an "original" frame may show all objects of the video scene in equal resolution. However, a "decomposed predominant sounds+metadata" frame may show just those video objects extracted from the "original" frame that are co-located with energy-predominant audio objects of the corresponding audio frame of the soundfield representation. Additionally, a "background" frame may show the "original" frame with those video objects of the "predominant sounds+metadata" frame removed, and with the remaining video objects at a lower resolution. That is, a "background" frame may include only video objects that are collocated with background or ambient audio objects in the corresponding audio frame of the soundfield representation. A "compressed" frame may show the video objects video objects of the "predominant sounds+metadata" frame at a high resolution, and with the video objects of the "background" frame at a lower resolution.

Figure 9:
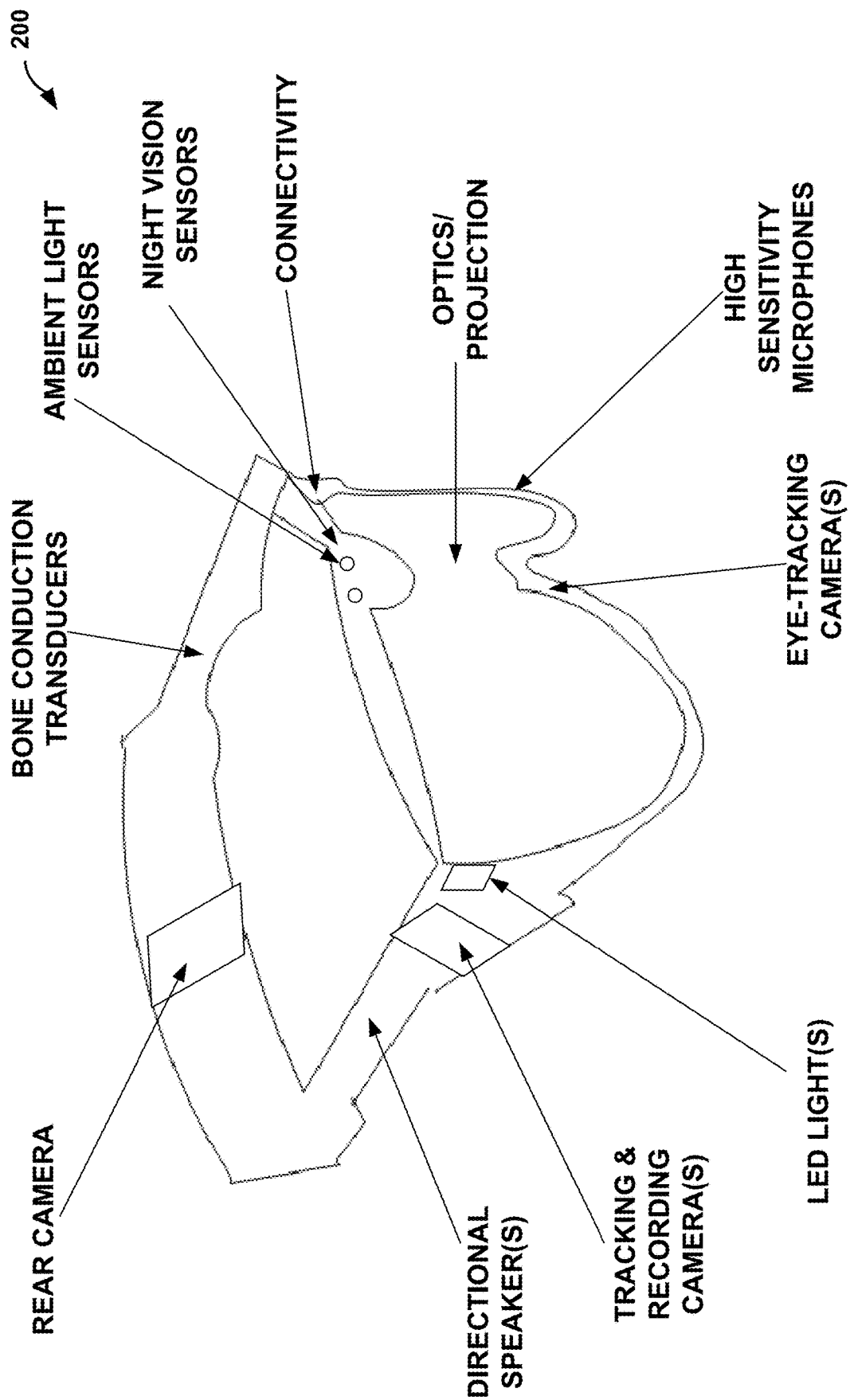
FIG. 9 is a diagram illustrating an example of a headset that one or more computer-mediated reality systems of this disclosure may use.

FIG. 9 is a diagram illustrating an example of a headset 200 that one or more computer-mediated reality systems of this disclosure may use. In various examples, the headset 200 may represent a VR headset, an AR headset, an MR headset, or an extended reality (XR) headset. As shown, the headset 200 includes a rear camera, one or more directional speakers, one or more tracking and/or recording cameras, and one or more light-emitting diode (LED) lights. In some examples, the LED light(s) may be referred to as "ultra-bright" LED light(s). In addition, the headset 200 includes one or more eye-tracking cameras, high sensitivity audio microphones, and optics/projection hardware. The optics/projection hardware of the headset 200 may include durable semi-transparent display technology and hardware.

The headset 200 also includes connectivity hardware, which may represent one or more network interfaces that support multimode connectivity, such as 4G communications, 5G communications, etc. The headset 200 also includes ambient light sensors, and bone conduction transducers. In some instances, the headset 200 may also include one or more passive and/or active cameras with fisheye lenses and/or telephoto lenses. Various devices of this disclosure, such as the content consumer device 14 of FIG. 2 may use the steering angle of the headset 200 to select an audio representation of a soundfield to output via the directional speaker(s) of the headset 200, in accordance with various techniques of this disclosure. It will be appreciated that the headset 200 may exhibit a variety of different form factors.

Figure 10A:
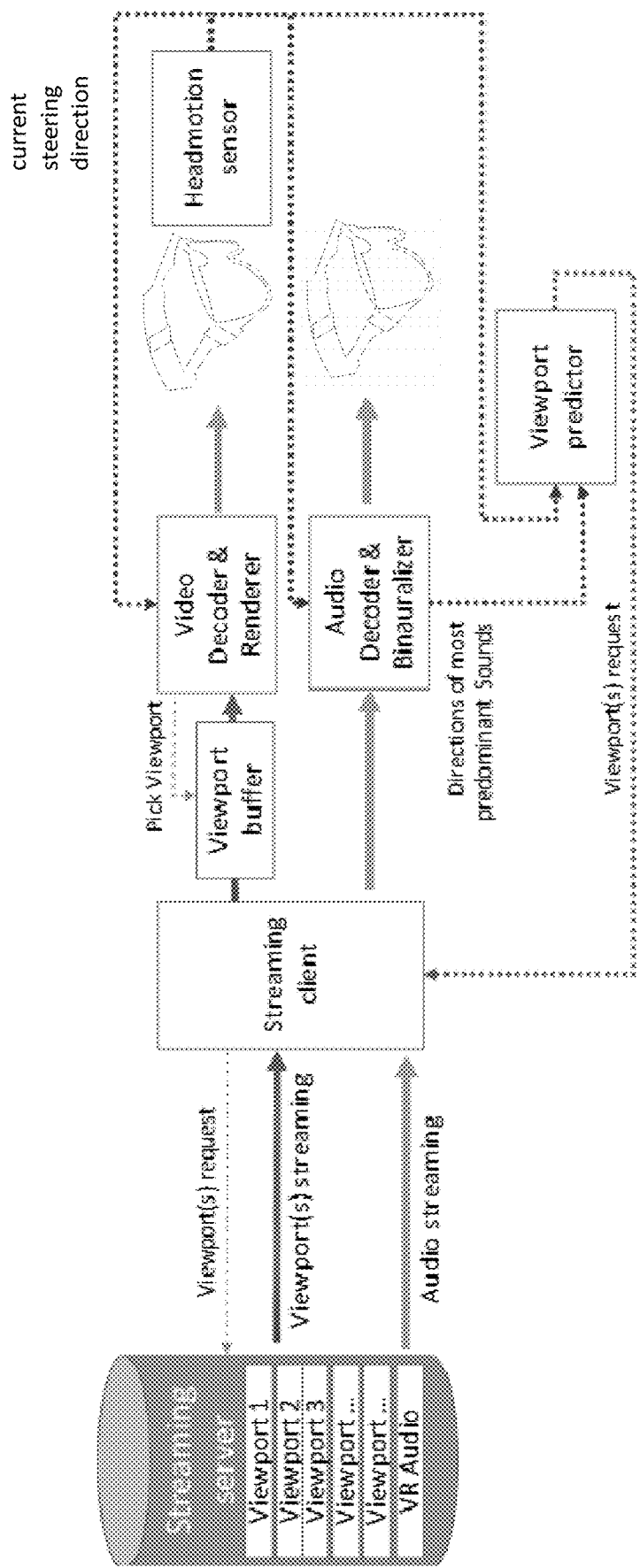
FIG. 10A is a diagram illustrating a mechanism by which a streaming client of this disclosure may request resolution-specific streaming of video data on a viewport-by-viewport basis, based on analysis of audio spatial metadata.

FIG. 10A is a diagram illustrating a mechanism by which a streaming client of this disclosure may request resolution-specific streaming of video data on a viewport-by-viewport basis, based on analysis of audio spatial metadata. The streaming server is one example of the source device 12 of FIG. 2, and the streaming client is one example of the content consumer device 14 of FIG. 2. The streaming client may implement a predictive algorithm to request the 'N' most likely-next viewports (as determined from the audio spatial metadata) to be streamed from the streaming server. The streaming client may perform the prediction based on various criteria, including the direction of the predominant audio components in the audio bitstream received from the streaming server, and the current FoV.

According to various aspects of this disclosure, the streaming client of FIG. 10A may determine the locations of the foreground audio objects of the soundfield representation received via the audio stream. For instance, the streaming client may use the energy of the various objects of the soundfield to determine which objects qualify as foreground audio objects. In turn, the streaming client may map the positions of the foreground audio objects in the soundfield to corresponding positions in the corresponding video data, such as to one or more of the tiles 116 illustrated in FIG. 3B. If the streaming client determines that foreground audio objects that are to be played back imminently map to positions in viewports (or tiles) that is different from the current FoV viewport (or tile), then the streaming client may predict that the user's FoV will change, to track the viewport positions that map to the position(s) of the soon-to-be-rendered foreground audio objects.

Based on the audio-driven prediction described above, the streaming client may request high-resolution video data of the predicted viewport(s) from the streaming server, prior to the FoV actually changing to any of the predicted viewport(s). In this way, the streaming client of FIG. 10A may predictively request and obtain high-resolution video data for future FoV viewports, while reducing or potentially eliminating the lag time experienced by a user when changing the FoV to a different viewport or a group of different viewport(s).

Figure 10B:
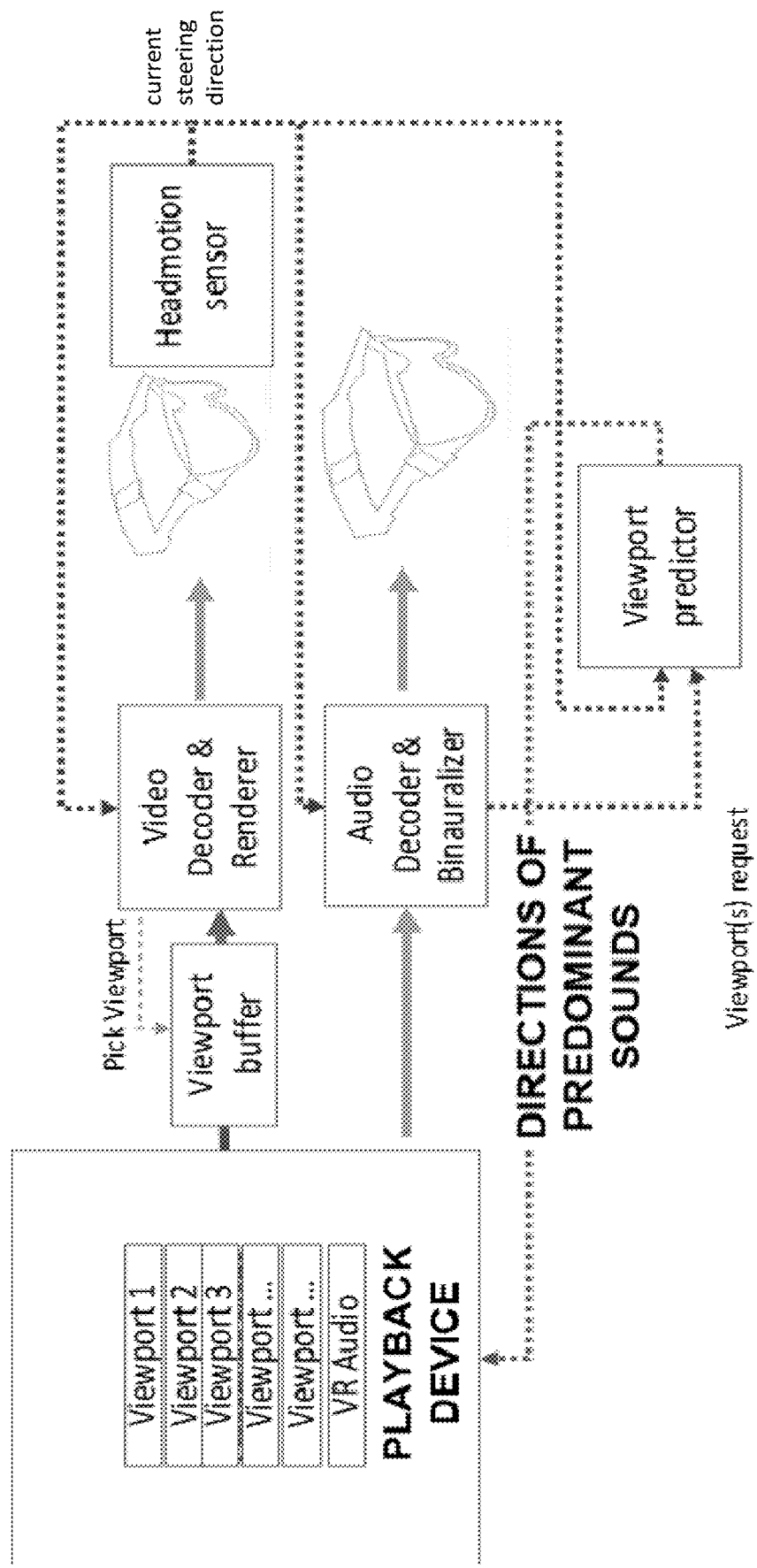
FIG. 10B is a diagram illustrating a mechanism by which a playback device may implement local selection of resolution-specific video data on a viewport-by-viewport basis, based on analysis of audio spatial metadata.

FIG. 10B is a diagram illustrating a mechanism by which a playback device may implement local selection of resolution-specific video data on a viewport-by-viewport basis, based on analysis of audio spatial metadata. The playback device of FIG. 10B may include, be, or be part of that any computer-mediated reality device may implement the techniques of this disclosure, such as the playback device 14 of FIG. 2. Examples of other devices that may implement the local selection of resolution-specific video data on a viewport-by-viewport basis include virtual reality (VR), augmented reality (AR), mixed reality (MR), or extended reality (XR) devices.

The playback device of FIG. 10B may implement a predictive algorithm to identify the 'N' most likely-next viewports (as determined from the audio spatial metadata) to be retrieved from local storage and played back via display hardware (e.g., the headset 200 illustrated in FIG. 9). The playback device may perform the prediction based on various criteria, including the direction of the predominant audio components in the soundfield representation being played back for the computer-mediated reality (e.g., VR) experience, and the current FoV.

According to various aspects of this disclosure, the playback device of FIG. 10B may determine the locations of the foreground audio objects of the soundfield representation to be rendered or currently being rendered for the computer-mediated reality (e.g., VR) experience. For instance, the playback device may use the energy of the various objects of the soundfield to determine which objects qualify as foreground audio objects. In turn, the playback device may map the positions of the foreground audio objects in the soundfield to corresponding positions in the corresponding video data, such as to one or more of the tiles 116 illustrated in FIG. 3B. If the playback device determines that foreground audio objects that are to be played back imminently map to positions in viewports (or tiles) that is different from the current FoV viewport (or tile), then the playback device may predict that the user's FoV will change, to track the viewport positions that map to the position(s) of the soon-to-be-rendered foreground audio objects.

Based on the audio-driven prediction described above, the playback device may select high-resolution video data of the predicted viewport(s) from the locally-stored video data, prior to the FoV actually changing to any of the predicted viewport(s). In this way, the playback device of FIG. 10B may predictively select high-resolution video data for future FoV viewports and prepare the selected high-resolution video data for output via the corresponding viewport(s), while reducing or potentially eliminating the lag time experienced by a user when changing the FoV to a different viewport or a group of different viewport(s).

Figure 11:
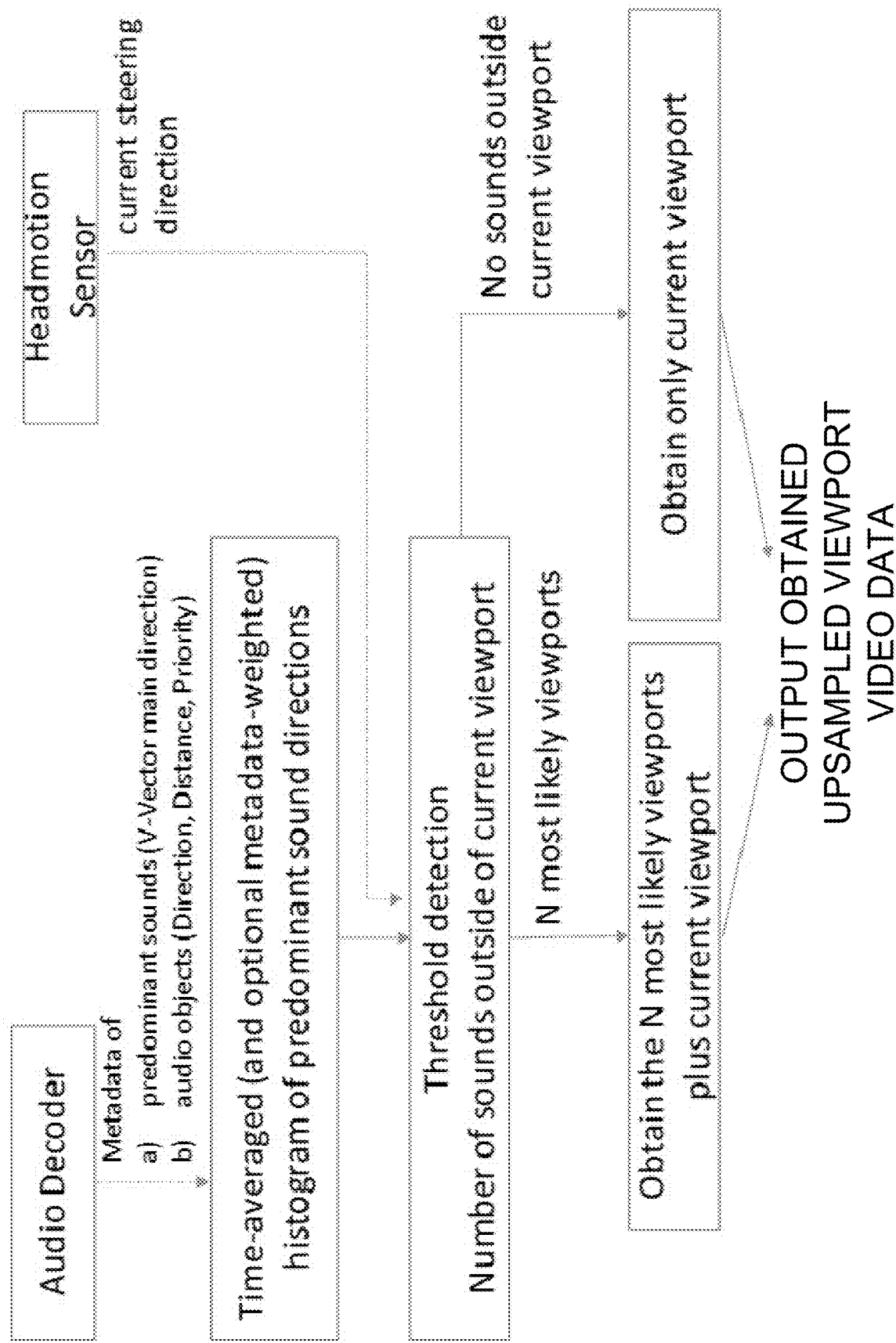
FIG. 11 is a diagram illustrating an example workflow that the streaming client of this disclosure may implement to perform viewport prediction.

FIG. 11 is a diagram illustrating an example workflow that the streaming client of this disclosure may implement to perform viewport prediction. The audio decoding device 24 may use metadata (e.g., audio spatial metadata) available from a 3D HOA soundfield representation to determine predominant sounds of the 3D HOA soundfield. For instance, the audio decoding device 24 may use a V-vector main direction of the audio objects. In a streaming scenario, the audio decoding device 24 may use audio spatial metadata received in the bitstream(s) 21. In a local-storage scenario, the audio decoding device 24 may use audio spatial metadata from a 3D HOA soundfield representation stored locally at the content consumer device 14. The audio decoding device 24 may also use metadata associated with the audio objects (e.g., direction, distance, and priority information) to determine the energy-predominant sounds of the soundfield. In turn, the audio decoding device 24 may calculate a time-averaged (and optionally, metadata-weighted) histogram of the predominant sound directions of the 3D soundfield.

The content consumer device 14 may implement threshold detection, to determine a number of sounds that are positioned outside of the current FoV viewport. If the number of detected sounds crosses the threshold value, then the content consumer device 14 may determine the 'N' most likely-next viewports. 'N' represents an integer value. In turn, if the number of sounds that fall outside the current viewport crosses the threshold value, then the content consumer device 14 may obtain upsampled video data for all of the 'N' most likely-next viewports. In a streaming scenario, the content consumer device 14 may request the upsampled video data for all of the 'N' most likely-next viewports from the source device 12. In a local-storage scenario, the content consumer device 14 may retrieve the upsampled video data for all of the 'N' most likely-next viewports from local storage of the content consumer device 14.

However, if the content consumer device 14 determines that no sounds (or a non-threshold-crossing number of sounds) are located outside of the current viewport(s), then the s content consumer device 14 may obtain upsampled video data only for the current FoV viewport(s). As shown in FIG. 11, to determine the current viewport(s) being viewed by the user (i.e., the current FoV viewport(s)), the content consumer device 14 may use the current steering angle of the VR headset. In a streaming scenario, the content consumer device 14 may request the upsampled video data for just the current FoV viewport from the source device 12. In a local-storage scenario, the content consumer device 14 may retrieve the upsampled video data for just the current FoV viewport from local storage of the content consumer device 14.

As described above with respect to FIG. 11, the content consumer device 14 may include various means to track the user's head motion, such as VR headset tracking, gaze tracking, etc. The content consumer device 14 may use the tracked head motion in order to render the audio and video to suit the user's current viewing gaze (e.g., gaze angle or steering direction). In turn, the content consumer device 14 may obtain the upsampled video data for the appropriate viewport for the current viewing gaze. As examples, the content consumer device 14 may retrieve the upsampled video data from local storage, or request the upsampled video data from the source device 12. In turn, the content consumer device 14 may output the obtained upsampled video data for the selected viewport(s), whether the selection was for just the current FoV viewport or for one or more predicted viewports.

To implement the decision of selecting which of the available viewports is (e.g., partially) determined by information from the accompanying spatial audio content, the content consumer device 14 device may base the decision on a parsing of the directional audio parameters either from the compressed HOA bitstream (using the direction of a predominant sound and/or a direction of an HOA V-vector), or object-related metadata (e.g., direction, distance, object priority) of the soundfield representation. The content consumer device 14 may predict the likely-next viewport(s) using the information listed above, as being the data that the content consumer device 14 may need to obtain, for playback in the near future. In some examples, rather than base the decision on directional audio parameters available from the soundfield representation, the content consumer device 14 may compute and use a spatial energy distribution of the decoded spatial audio content for the viewport prediction.

For instance, the content consumer device 14 may determine that a user is looking to the frontal direction, based on the tracked steering angle. In this example, the content consumer device 14 may obtain upsampled video data for the viewport with the best video quality for the viewport(s) that are positioned in the frontal direction with respect to the user's position. In turn, in this example, the content consumer device 14 may determine that the soundfield representation includes a loud audio object collocated with the user's right side imminently (e.g., in approximately one second). Based on the determination of the imminent playback of a loud audio object (e.g., an audio object displaying greater energy), the content consumer device 14 may predict that the user is likely to look to the right imminently, based on the direction of the loud audio element/object that is to be rendered. The content consumer device 14 may implement the techniques of this disclosure to leverage the audio-based determination of the loud sound being positioned to the user's right to pre-fetching upsampled video data for the right viewport, because the upsampled video data for the right viewport that represents the loud audio object's direction with the best available video quality.

Figure 12:
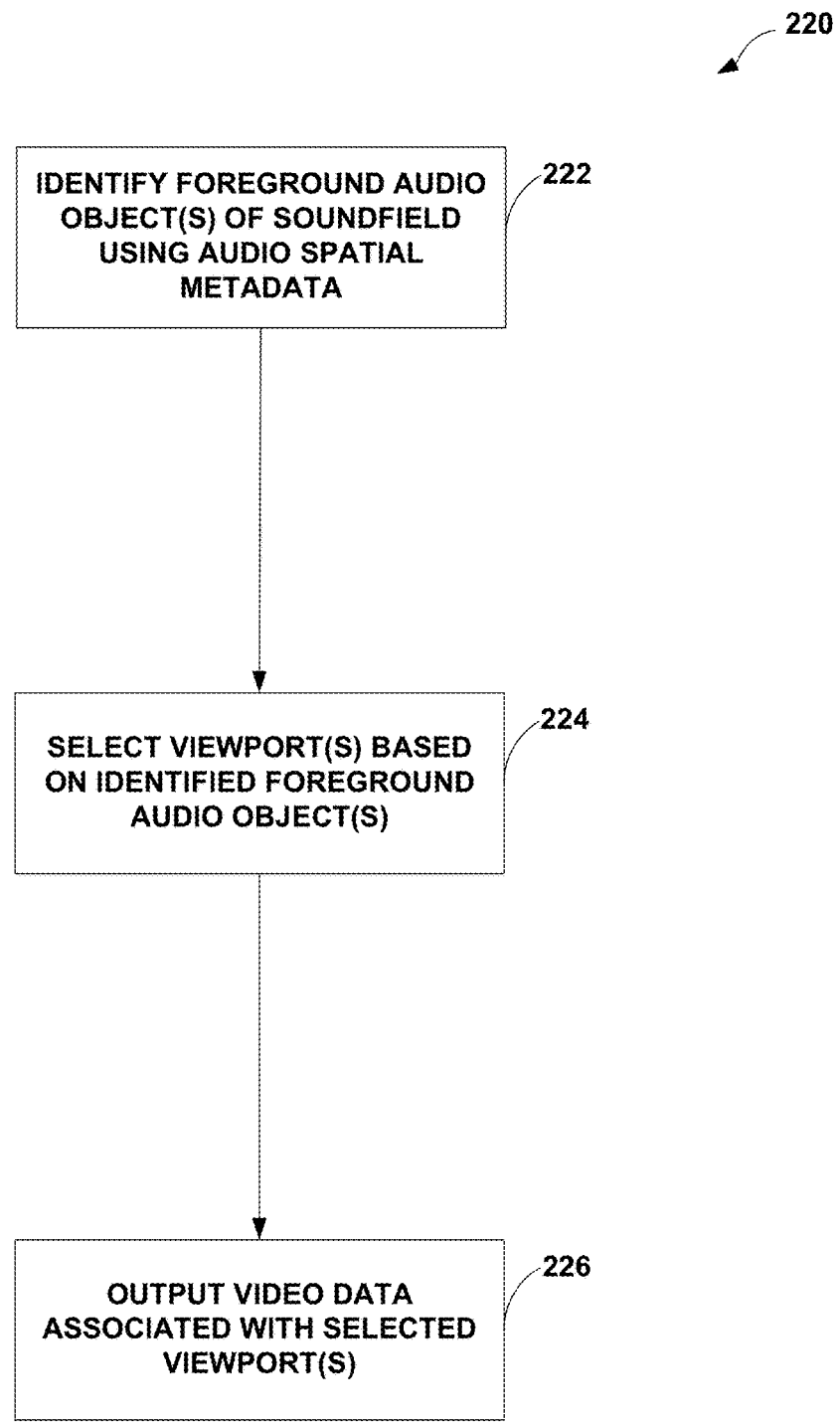
FIG. 12 is a flowchart illustrating an example process that a device (e.g., the playback device of FIG. 10B) may perform, in accordance with one or more aspects of this disclosure.

FIG. 12 is a flowchart illustrating an example process 220 that a device (e.g., the playback device of FIG. 10B) may perform, in accordance with one or more aspects of this disclosure. Process 220 may begin when the playback device identifies, using a processor coupled to a memory, one or more foreground audio objects of a soundfield, using audio spatial metadata stored to the memory (222). In turn, the processor of the playback device may select, based on the identified one or more foreground audio objects, one or more viewports associated with video data stored to the memory device (224). The playback device may include display hardware coupled to the processor and to the memory, or may be coupled to such display hardware, such as display hardware of the headset 200. The display hardware may output a portion of the video data (which is stored to the memory), the portion being associated with the one or more viewports selected by the processor (226).

In some examples, the processor of the playback device may an energy associated with the identified one or more foreground audio objects. In some examples, the processor of the playback device may determine a number of viewports associated with the identified one or more viewports based on the identified one or more foreground audio objects. In some examples, the processor of the playback device may upsample a portion of the stored video data that is associated with the identified one or more foreground audio objects. In these examples, the display hardware may output the upsampled portion of the video data.

In some examples, one or more loudspeakers (e.g., speaker hardware of the headset 200) may output an audio data format representative of the soundfield. In some examples, the processor the playback device may detect updated field of view (FoV) information, and may update the identified one or more viewports based on the updated FoV information. In some examples, the display hardware may output only the portion of the video data that is associated with the selected one or more viewports, without outputting a remainder of the video data that is not associated with the one or more viewports.

In some examples, the memory device of the playback device may store a plurality of representations of the soundfield, the plurality of representations including a plurality of object-based representations of the soundfield, higher order ambisonic representations of the soundfield, mixed order ambisonic representations of the soundfield, channel-based representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield. In some examples, the memory device of the playback device may store spatial audio content associated with the soundfield, and the processor of the playback device may select the one or more viewports further based on a spatial energy distribution of spatial audio content associated with the soundfield.

In some examples, the processor of the playback device may select the one or more viewports further based on a spatial energy distribution of spatial audio content associated with the soundfield. In some examples, the memory device of the playback device may store an HOA representation of the soundfield that includes the spatial metadata, and the processor of the playback device may parse the HOA representation to obtain a direction of a predominant sound. In these examples, the processor of the playback device may select the one or more viewports further based on the direction of the predominant sound.

In some examples, the memory device of the playback device may store an object-based representation of the soundfield that includes the spatial metadata, and the processor of the playback device may parse the object-based representation to obtain object-related metadata that includes one or more of a direction, a distance, or an object priority. In these examples, the processor of the playback device may select the one or more viewports based on the object-related metadata.

In some examples, the processor of the playback device may track a steering angle provided by one or more angles associated with a device (e.g., the headset 200) that is paired to the playback device and/or includes the processor and the memory device. In these examples, the processor of the playback device may select the one or more viewports further based on the steering angle. In some examples, the processor of the playback device may select a current viewport of the one or more viewports based on the steering angle, and may select a predicted viewport of the one or more viewports based on the based on the identified one or more foreground audio objects.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
   a memory configured to store a bitstream and audio spatial metadata associated with an ambisonic representation of a soundfield that includes one or more foreground audio objects, the audio spatial metadata describing a directionality of the one or more foreground audio objects; and
   a processor, coupled to the memory, the processor configured to:
      decode the bitstream associated with the soundfield and the audio spatial metadata, and identify one or more foreground audio objects of the soundfield using the audio spatial metadata stored to the memory;
      parse the audio spatial metadata, that includes the ambisonic representation of the identified one or more foreground audio objects, to obtain one or more directions of one or more predominant sounds;
      select a predicted viewport of one or more viewports associated with video data viewports based on the one or more directions of the one or more predominant sounds, wherein the one or more predominant sounds identify the one or more foreground audio objects; and
      request a portion of the video data that is associated with the predicted viewport at a higher resolution than a current resolution at which the portion of the video data that is associated with the predicted viewport was previously requested.

2. The device of claim 1, wherein the processor is further configured to:
   determine an energy associated with the identified one or more foreground audio objects; and use the energy associated with the identified one or more foreground audio objects to select the predicted viewport of one or more viewports.

3. The device of claim 1, wherein the processor is further configured to determine a number of viewports associated with the one or more viewports based on the identified one or more foreground audio objects.

4. The device of claim 1, wherein the processor is further configured to upsample a portion of the video data stored to the memory, the upsampled portion being associated with the selected predicted viewport of the one or more viewports.

5. The device of claim 1, further comprising one or more loudspeakers configured to output an audio data format representative of the soundfield including the identified one or more foreground audio objects.

6. The device of claim 1, wherein the processor is configured to:
   detect an updated field of view (FoV) information associated with a 3D canvas; and
   update the selected predicted viewport of the one or more viewports based on the updated FoV information.

7. The device of claim 1, wherein the memory is further configured to store a plurality of representations of the soundfield, the plurality of representations comprising a plurality of object-based representations of the soundfield, higher order ambisonic representations of the soundfield, mixed order ambisonic representations of the soundfield, channel-based representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

8. The device of claim 1, wherein the processor is configured to select the predicted viewport further based on a spatial energy distribution of spatial audio content associated with the soundfield.

9. The device of claim 1 wherein the processor is configured to parse the bitstream, that includes an object-based representation and the spatial audio metadata, to obtain object-related metadata that includes one or more of a direction, a distance, or an object priority, and select the predicted viewport of the one or more viewports based on the object-related metadata.

10. The device of claim 1, further comprising a display, coupled to the processor and the memory, wherein the display is configured to output an upsampled portion of the video data at respective surfaces of a 3D canvas associated with the selected predicted viewport of the one or more viewports.

11. The device of claim 1, further comprising a display, coupled to the processor and the memory, wherein the display is configured to output only the portion of the video data that is associated with the predicted viewport selected by the processor without outputting a remainder of the video data that is not associated with the selected predicted viewport.

12. The device of claim 1, wherein the processor is configured to select the predicted viewport of one or more viewports associated with the video data, further based on a steering angle associated with a positioning of the device after the one or more foreground audio objects are identified.

13. The device of claim 1, wherein the processor is configured to select the predicted viewport of one or more viewports associated with the video data, further based on eye gaze after the one or more foreground audio objects are identified.

14. The device of claim 1, wherein the processor is configured to represent video objects associated with the video data and the identified one or more foreground audio objects at a higher resolution than video objects associated with video data and not associated with the identified one or more foreground audio objects.

15. The device of claim 14, further comprising a memory configured to store a bitstream representing compressed video objects, associated with the video data and the identified one or more foreground audio objects, at a higher resolution, and configured to store the bitstream representing compressed video objects, associated with video data not associated with the identified one or more foreground audio objects, at a lower resolution.

16. The device of claim 14, further comprising a memory configured to store a bitstream representing compressed video objects associated with the video data, wherein compressed video objects associated with one or more foreground audio objects are stored at a higher resolution compressed video objects than compressed video objects that are stored at a lower resolution that are not associated with one or more foreground audio objects.

17. The device of claim 1, wherein the bitstream includes the audio spatial metadata.

18. The device of claim 1, wherein the predicted viewport is a current viewport after selection of the predicted viewport based on the identified one or more foreground audio objects.

19. A method comprising:
  decoding a bitstream associated with an ambisonic representation of a soundfield that includes one or more foreground audio objects and associated audio spatial metadata, the audio spatial metadata describing a directionality of one or more foreground audio objects of the soundfield;
    identifying, by a processor, the one or more foreground audio objects of the soundfield using the audio spatial metadata;
    parsing, by the processor, the audio spatial metadata that includes an ambisonic representation of the one or more foreground audio objects, to obtain a one or more directions of one or more predominant sounds;
  selecting, by the processor, a predicted viewport of the one or more viewports associated with video data based on the one or more directions of the one or more predominant sounds, wherein the one or more predominant sounds identify the one or more foreground audio objects; and
  requesting a portion of the video data that is associated with the predicted viewport at a higher resolution than a current resolution at which the portion of the video data that is associated with the predicted viewport was previously requested.

20. The method of claim 19, further comprising:
  determining, by the processor, an energy associated with the identified one or more foreground audio objects; and
  using the energy associated with the identified one or more foreground audio objects to select the predicted viewport of the one or more viewports.

21. The method of claim 19, further comprising determining, by the processor, a number of viewports associated with the one or more viewports based on the identified one or more foreground audio objects.

22. The method of claim 19, further comprising:
  upsampling, by the processor, a portion of the video data stored to a memory, the upsampled portion being associated with the selected predicted viewport of the one or more viewports; and
  displaying the upsampled portion of the video data.

23. The method of claim 19, further comprising:
  detecting an updated field of view (FoV) information associated with a 3D canvas; and
  updating the selected predicted viewport of the one or more viewports based on the updated FoV information.

24. The method of claim 19, further comprising:
  displaying only the portion of the video data that is associated with the selected predicted viewport of the one or more viewports without outputting a remainder of the video data that is not associated with the selected predicted viewport of the one or more viewports.

25. The method of claim 19, further comprising storing, to a memory, a plurality of representations of the soundfield, the plurality of representations comprising a plurality of object-based representations of the soundfield, higher order ambisonic representations of the soundfield, mixed order ambisonic representations of the soundfield, channel-based representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

26. The method of claim 19, further comprising:
  selecting, by the processor, the predicted viewport of the one or more viewports further based on a spatial energy distribution of spatial audio content associated with the soundfield.

27. The method of claim 19, further comprising selecting the predicted viewport of the one or more viewports further based on a spatial energy distribution of spatial audio content associated with the soundfield.

28. The method of claim 19, further comprising:
  parsing, by the processor, the bitstream that includes an object-based representation and the spatial audio metadata to obtain object-related metadata that includes one or more of a direction, a distance, or an object priority; and selecting, by the processor, the predicted viewport of the one or more viewports based on the object-related metadata.

\* \* \* \* \*